United States Patent
Fotheringham et al.

(10) Patent No.: US 7,017,370 B1
(45) Date of Patent: *Mar. 28, 2006

(54) METHOD AND DEVICE FOR THE HOMOGENOUS HEATING OF GLASS AND/OR GLASS-CERAMIC ARTICLES USING INFRARED RADIATION

(75) Inventors: Ulrich Fotheringham, Wiesbaden (DE); Hauke Esemann, Wörrstadt (DE); Markus Garsche-Andres, Stadecken-Elsheim (DE); Bernd Hoppe, Ingelheim (DE); Matthias Brinkmann, Klein-Winternheim (DE); Norbert Greulich-Hickmann, Mainz (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/936,916

(22) PCT Filed: Mar. 22, 2000

(86) PCT No.: PCT/EP00/02507

§ 371 (c)(1),
(2), (4) Date: Nov. 26, 2001

(87) PCT Pub. No.: WO00/56675

PCT Pub. Date: Sep. 28, 2000

(30) Foreign Application Priority Data

Mar. 23, 1999 (DE) .............. 299 05 385 U
Aug. 19, 1999 (DE) ................ 199 38 808

(51) Int. Cl.
*C03B 32/00* (2006.01)
*B29C 35/08* (2006.01)

(52) U.S. Cl. .................... 65/33.2; 65/111; 65/273; 65/274; 264/405

(58) Field of Classification Search ............ 65/117, 65/118, 119, 120, 269, 274, 273, 271, 258, 65/33.2, 111; 264/1.27, 402, 403, 404, 405; 219/411, 553; 34/266, 519, 201; 250/493.1, 250/495.1, 496.1

See application file for complete search history.

(56) References Cited

U.S. PATENT DOCUMENTS

| | | | |
|---|---|---|---|
| 1,630,724 A | 5/1927 | Tillyer | |
| 1,953,023 A | 3/1934 | Mulholland | |

(Continued)

FOREIGN PATENT DOCUMENTS

DE 740 892 9/1943

(Continued)

*Primary Examiner*—Dionne A. Walls
*Assistant Examiner*—Carlos Lopez
(74) *Attorney, Agent, or Firm*—Baker & Daniels

(57) ABSTRACT

A method for the homogeneous heating of semitransparent and/or transparent glass and/or glass-ceramic articles using infrared radiation so that the glass and/or glass-ceramic articles undergo heat treatment at between 20 and 3000° C., notably at between 20 and 1705° C. Heating is achieved by a component of infrared radiation which acts directly on the glass and/or glass-ceramic articles and by a component of infrared radiation which acts indirectly on said glass and/or glass-ceramic articles. The radiation component indirectly acting on the glass and/or glass-ceramic articles accounts for more than 50% of total radiation output.

23 Claims, 3 Drawing Sheets

U.S. PATENT DOCUMENTS

| | | | |
|---|---|---|---|
| 2,125,912 A | 8/1938 | George et al. | 219/36 |
| 2,131,873 A | 10/1938 | Goodwillie | 49/7 |
| 2,825,183 A | 3/1958 | Riedel | 49/17 |
| 2,973,190 A | 2/1961 | Schuller | 263/2 |
| 3,045,994 A | 7/1962 | Longenecker | 263/46 |
| 3,120,433 A | 2/1964 | Van Zee | 65/43 |
| 3,193,367 A | 7/1965 | Giffen | 65/70 |
| 3,620,706 A | 11/1971 | Spanoudis | |
| 3,880,632 A * | 4/1975 | Podvigalkina | 65/37 |
| 4,213,753 A | 7/1980 | Negroni et al. | 432/247 |
| 4,547,650 A | 10/1985 | Arditty et al. | 219/121 LE |
| 4,789,771 A | 12/1988 | Robinson et al. | |
| 4,889,547 A | 12/1989 | Lecourt et al. | 65/107 |
| 4,983,202 A | 1/1991 | Deb et al. | 65/104 |
| 6,710,306 B1 * | 3/2004 | Hahn et al. | 219/411 |
| 2003/0182966 A1 * | 10/2003 | Fotheringham et al. | 65/33.2 |

FOREIGN PATENT DOCUMENTS

| | | |
|---|---|---|
| DE | 807 132 | 6/1951 |
| DE | 1 024 684 | 2/1958 |
| DE | 24 32 538 | 1/1976 |
| EP | 0 058 529 | 8/1982 |
| EP | 0 112 224 | 6/1984 |
| EP | 0133847 | 6/1985 |
| EP | 0 317 409 | 5/1989 |
| EP | 0376509 | 4/1990 |
| EP | 0 376 509 | 7/1990 |
| FR | 802.598 | 9/1936 |
| FR | 2 267 987 | 11/1975 |
| FR | 2 386 492 | 2/1978 |
| FR | 2 505 472 | 11/1982 |
| FR | 2 606 866 | 5/1988 |
| GB | 651989 | 4/1951 |
| GB | 729072 | 5/1955 |
| GB | 2 320 021 | 6/1998 |
| JP | 07-18323 * | 1/1995 |
| RU | 560841 | 8/1977 |
| RU | 660949 | 5/1979 |
| WO | WO 98/57899 | 12/1998 |

* cited by examiner

METHOD AND DEVICE FOR THE HOMOGENOUS HEATING OF GLASS AND/OR GLASS-CERAMIC ARTICLES USING INFRARED RADIATION

BACKGROUND OF THE INVENTION

Method and device for the homogeneous heating of glass and/or glass-ceramic articles using infrared radiation.

The invention relates to a process for the homogeneous heating of semi-transparent and/or transparent glass articles and/or of glass-ceramic articles with the aid of infrared radiation, whereby the glass articles and/or the glass-ceramic articles undergo a heat treatment in the range from 20° C. to 3000° C., as well as to a device for the homogeneous heating of translucent and/or transparent glass articles and/or glass-ceramic.

Semi-transparent or transparent glass and/or glass-ceramics, for the setting-in of certain material properties, for example ceramization, are heated mostly to temperatures which lie preferably over the lower cooling point (viscosity $Z=10^{14.5}$ dPas). In form-giving processes, especially hot after-processing, the semi-transparent or transparent glass and/or the glass-ceramic material is heated up to the processing point (viscosity $Z=10^4$ dPas) or beyond that. Typical lower cooling points can amount, depending on the type of glass, to between 282° C. and 790° C., and typically the processing point can be up to 1705° C.

Hitherto according to the state of the art semi-transparent or transparent glasses and/or glass-ceramics, for example for ceramization, were heated preferably with surface heating. As surface heating there are designated processes in which at least 50% of the total heat output of the heat source is introduced into the surface or surface-near layers of the object to be heated.

If the radiation source is black or gray and if it has a color temperature of 1500 K, then the source radiates off 51% of the total radiation output in a wavelength range above 2.7 µm. If the color temperature is less than 1500 K, as in most electric resistance heating elements, then substantially more than 51% of the radiation output is given off above 2.7 µm.

Since most glasses in this wavelength range have an absorption edge, 50% or more of the radiation output is absorbed by the surface or in surface-near layers. It is possible, therefore, to speak of surface heating. Another possibility lies in heating glass and glass-ceramics with a gas flame, in which typical flame temperatures lie at 1000° C. Such a heating occurs mainly by direct transfer of the thermal energy of the hot gas onto the surface of the glass or of the glass-ceramic, so that here it is possible to proceed from a predominantly surface/superficial/heating.

In general with the earlier described surface heating the surface or surface-near layers are heated in the parts of the glass or of the glass-ceramic that lie opposite the heating source. The remaining glass volume or glass-ceramic volume must accordingly be heated up correspondingly by heat conduction within the glass or the glass-ceramic material.

Since glass or glass-ceramic material has as a rule a very low heat conductivity in the range of 1 W (m K), glass or glass-ceramic material must be heated up more and more slowly in order to keep tensions in the glass or glass-ceramics low.

A further disadvantage of known systems is that, in order to achieve a homogeneous heating-up of the surface, the surface of the glass or of the glass-ceramic material must be covered as completely as possible with heating elements. Limits are placed there on conventional heating processes.

With electrical heating resistances made of Kanthal wire, as they are preferably used, at 1000° C., for example, only a wall load of maximally 60 kW/m² is possible, while a full-surfaced (or holohedral) black radiator of the same temperature could irradiate an output density of 149 kW/m².

With a denser packing of the heating elements to be equated with a higher wall load, these would heat themselves up reciprocally, which through the resulting heat accumulation would involve an extreme shortening of the useful life of the heating elements.

When a homogeneous heating-up of the glass or of the glass-ceramic is not achieved or is only inadequately successful, then this unfailingly results in inhomogeneities in the process and/or in the product quality. For example, any irregularity in the process conducting, in the ceramization process of glass-ceramics leads to a cambering or bursting of the glass-ceramic article.

From DE 42 02 944 C2 there has become known a process and a device comprising IR radiators for the rapid heating of materials which have a high absorption above 2500 nm. In order to rapidly introduce, into the material, the heat given off from the IR radiators, DE 42 02 944 C2 proposes the use of a radiation converter from which secondary radiation is emitted with a wavelength range which is shifted into the long-wave direction with respect to the primary radiation.

A heating of transparent glass homogeneous in depth with use of short-wave IR radiators is described in U.S. Pat. No. 3,620,706. The process according to U.S. Pat. No. 3,620,706 is based on the principle that the absorption length of the radiation used in glass is very much greater than the dimensions of the glass object to be heated, so that the major part of the impinging radiation is let through by the glass and the absorbed energy per volume is nearly equal at every point of the glass body. What is disadvantageous in this process, however, is that no homogeneous irradiation over the surface of the glass objects is ensured, so that the intensity distribution of the IR radiation source is depicted on the glass to be heated. Moreover, in this process only a small part of the electric energy used is utilized for the heating of the glass.

The problem of the invention, therefore, is to give a process and a device for the homogeneous heating-up of semi-transparent or transparent glass and glass-ceramic articles, with which the aforementioned disadvantages are overcome.

SUMMARY OF THE INVENTION

According to the invention the problem is solved by the means that in a generic process the heating of the semi-transparent and/or transparent glass or glass-ceramic material is achieved by a proportion of infrared radiation acting directly on the glass and/or glass-ceramic material as well as a proportion of infrared radiation acting indirectly on the glass and/or glass-ceramic material, the share of the radiation acting indirectly on the glass or the glass-ceramic material being more than 50%, preferably more than 60%, preferably more than 70%, especially preferably more than 80%, especially preferably more than 90%, in particular more than 98% of the total radiation output.

It is preferred if the infrared radiation is short-wave infrared radiation with a color temperature greater than 1500 K, especially preferably greater than 2000 K, most preferably greater than 2400 K, especially preferably greater than 2700 K, especially preferably greater than 3000 K.

In a first form of execution of the invention it is provided that the infrared radiation acting indirectly on the glass and/or glass-ceramic material comprises at least a component (proportion) of reflected and/or scattered, especially diffusely scattered, radiation. Advantageously the component of the short-wave infrared radiation that is not absorbed by the glass or glass-ceramic material in the one-time impinging, i.e., reflected, scattered or let through, is on the average more than 50% of the total radiation output given off by the IR radiators.

If, for example, it is desired to cool slowly or heat rapidly, then in an advantageous execution of the invention it is provided that the process is carried out in an enclosed space, preferably an IR radiation hollow space. In an especially advantageous execution of such a process it is provided that the reflected and/or scattered infrared radiation is reflected and/or scattered by at least a part of the wall, base and/or cover surfaces. IR radiation hollow spaces are shown for example in U.S. Pat. No. 4,789,771 as well as EP-A-O 133 847, the disclosure content of which is fully taken into account in the present application. Preferably the component (proportion) of the infrared radiation reflected and/or scattered from the part of the wall, base and/or cover surfaces amounts to more than 50% of the radiation impinging on these surfaces.

It is especially preferred if the component of the infrared radiation reflected and/or scattered from the part of the wall, base and/or cover surfaces amounts to more than 90%, respectively 95%, in particular more than 98%.

A special advantage of using an IR radiation hollow space is, further, that with use of very strongly reflecting or back-scattering wall, base and/or cover materials it is a matter of a resonator of high Q quality, which is affected with only slight losses and, therefore, ensures a high utilization of energy.

In an alternative development of the invention it is provided that the infrared radiation acting indirectly on the glass and/or glass-ceramic materials comprises a component of infrared radiation which is absorbed by a carrier or support body, transformed into heat and is given off onto the glass and/or the glass-ceramic material thermally bound with the carrier body.

In a first development of this alternative it is provided that as carrier body ceramic plates are used.

It is especially advantageous if with the carrier body it is a matter of a highly heat-conductive carrier body of as high as possible emissivity, preferably of SiSiC in the form of plates.

Especially advantageously the heat conductivity of the carrier body in the range of the heat treatment temperature is at least five times as great as that of the glass and/or of the glass-ceramic material to be treated.

Besides the method, the invention also makes available a device for carrying out the method. The device of the invention is characterized in that means are provided for the generating of an infrared radiation acting indirectly on the glass and/or glass-ceramic materials, which means are arranged and designed in such manner that the component of the radiation acting indirectly on the glass and/or the glass-ceramic material amounts to more than 50% of the total radiation output.

In a first development of the invention it is provided that the means for generating an infrared radiation acting indirectly on the glass and/or glass-ceramic materials comprise reflectors and/or diffusors for the reflection and scattering, respectively, of the infrared radiation.

As diffusely back-scattering material there are used, for example, ground quarzal plates with a thickness of 30 mm. for example.

Also other materials reflecting or backscattering the IR radiation are possible, for example one or more of the following materials:

$Al_2O_3$; $BaF_2$; $BaTiO_3$; $CaF_2$; $CaTiO_3$;
MgO; 3.5 $Al_2O_3$; MgO, $SrF_2$; $SiO_2$;
$SrTiO_3$; $TiO_2$; spinell; cordierite;
cordierite sinter glass-ceramic If a rapid heating or a slow cooling is sought, then it is advantageously provided to accommodate the device in a bounded space, especially an IR radiation hollow space.

In a special development of the invention it is provided that the surface of the walls, of the bases and/or of the cover of the bounded space, preferably of the IR radiation hollow space, comprises the reflectors or diffusors.

One form of execution of the diffusor, for example, would be a diffusing screen.

It is especially preferred if the reflectors or diffusors are designed in such manner that more than 50% of the radiation impinging on these surfaces is reflected or scattered, respectively.

In an alternative form of execution it is provided that the means for the generation of indirect radiation comprise a carrier body which stands in thermal contact with the glass and/or glass-ceramic materials and absorbs a share of the indirect infrared radiation.

It is especially preferred if the carrier body comprises ceramic plates, preferably of SiSiC, and the emissivity of the carrier body is greater than 0.5. SiSiC has a high heat conductivity as well as a low porosity as well as a low adhesive tendency with respect to glass. The low porosity has the consequence that only a few undesired particles can collect in the pores. For this reason SiSiC is especially well suited for working in direct contact with glass.

In an especially advantageous form of execution it is provided that the heat conductivity of the carrier body, in the range of the heat treatment temperature, is at least five times as great as that of the glass or of the glass-ceramic material to be treated.

BRIEF DESCRIPTION OF THE DRAWINGS

The invention is to be described in the following by way of example with the aid of the drawings as well as of the examples of execution.

In the drawings.

DETAILED DESCRIPTION

Figure 1:
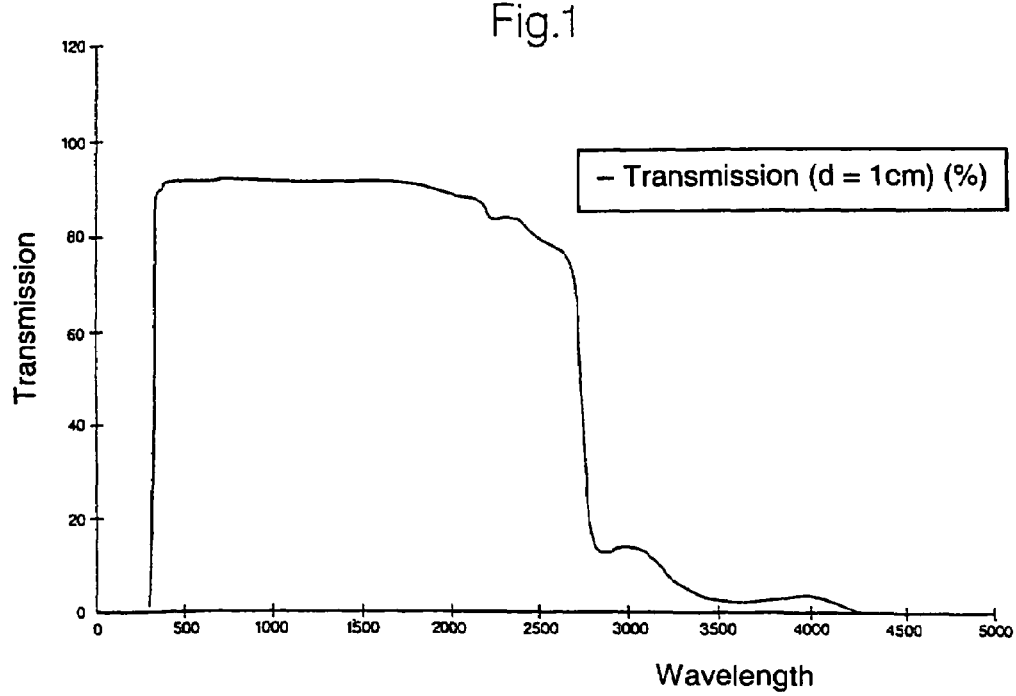
FIG. 1 shows the transmission course with a thickness of 1 cm of a typical glass material to be heated.

FIG. 1 shows the transmission curve over the wavelength of glass material used for the comparative tests of the present invention. The glass material has a thickness of 10 mm. There is clearly to be recognized the typical absorption edge at 2.7 μm, over which the glass or glass-ceramic material is opaque, so that the entire impinging radiation is absorbed on the surface or in the surface-near layers.

Figure 2:
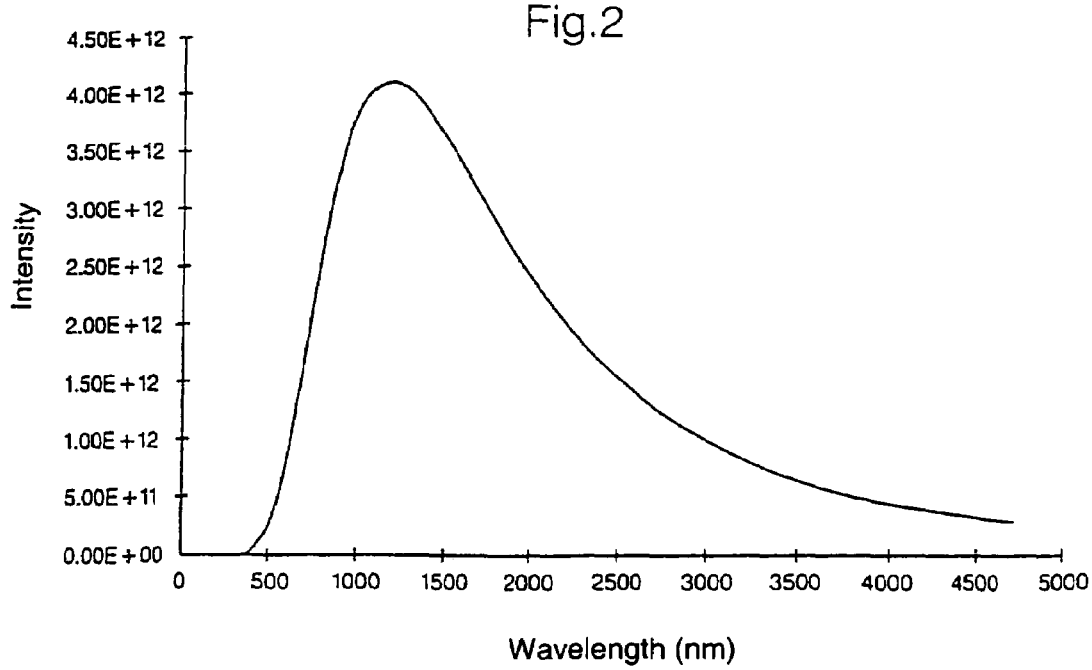
FIG. 2 the Planck curve of the IR radiator used with a temperature of 2400 K

FIG. 2 shows the intensity distribution of the preferably used IR radiation source. The IR radiators used are linear halogen IR quartz tube radiators with a nominal output of 2000 W at a voltage of 230 V, which have a color temperature of 2400 K. The IR radiators, corresponding to Wiensch's displacement law, have their radiation maximum at a wavelength of 1210 nm.

The intensity distribution of the IR radiation sources is yielded correspondingly from the Planck function of a black body with a temperature of 2400 K. It follows then that an appreciable intensity, i.e. an intensity greater than 5% of the radiation maximum, is released in the wavelength range of 500 to 5000 nm, and altogether ca. 75% of the total radiation output falls in the wavelength range above 1210 nm.

In a first form of execution of the invention only the annealing material is heated, while the environment remains cold.

The radiation passing by the annealing material is led by reflectors or diffusing scatterers or diffusing backscatterers onto the annealing material. In the case of high output densities and preferably of metal reflectors, the reflectors are water-cooled, since otherwise the reflector material would tarnish. This hazard is present especially with aluminum, which, because of its good reflecting properties in the IR range, is gladly used for radiators, especially for those of great radiation output. Alternatively to metal reflectors there can be used diffusely backscattering ceramic diffusors or partially reflecting and partially backscattering glazed reflectors, especially $Al_2O_2$.

A construction in which only the annealing material is heated can be used only when, after the heating-up, no slow cooling is required which, without insulating space, is obtainable with an acceptable homogeneity of temperature only with continuous reheating and only with a very high expenditure.

The advantage of such a construction is, however, the easy accessibility of the annealing material, for example for grippers which is of great interest especially in hot shaping.

In an alternative form of execution the heating device and the annealing material are located in an IR radiation hollow space equipped with IR radiators. This presumes that the quartz radiators themselves are sufficiently temperature stable or are cooled. The quartz glass tube is usable up to about 1100° C. It is preferred to make the quartz glass tube considerably longer than the heating spiral and to lead it out of the heating zone, so that the connections are in the cold zone in order not to overheat the electrical connections. The quartz glass tubes can be constructed with and without coating.

Figure 3A:
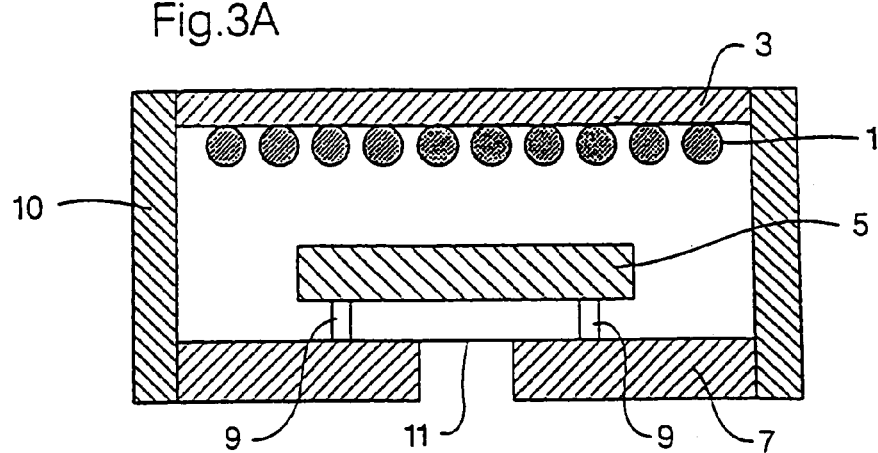
FIG. 3A the theoretical construction of a heating device with radiation hollow space.

In FIG. 3A a form of execution of a heating device according to the invention is represented with which the execution of the process of the invention is possible, without the invention being restricted to this.

The heating device shown in FIG. 3A comprises a large number of IR radiators 1 which are arranged underneath a reflector 3 made of strongly reflecting or diffusely backscattering material. By the reflector 3 it is achieved that the glass or glass-ceramic material 5 to be heated is heated from the upper side. The IR radiation given off from the IR radiators penetrates the glass or the glass-ceramic material 5 largely transparent in this wavelength range, and it impinges upon a carrier plate 7 of strongly reflecting or strongly scattering material. Especially well suited for this is quartz, which also in the infrared range backscatters approximately 90% of the impinging radiation. Alternatively to this there could also be used highly pure, sintered $Al_2O_3$, which has a backscattering, i.e. remission degree of approximately 98% with adequate thickness. The glass or glass-ceramic material 5 is emplaced on the carrier plate 7 with the aid of, for example, quarzal or $Al_2O_3$ strips 9. The temperature of the glass or glass-ceramic material underside can be measured through a hole 11 in the carrier plate with the aid of a pyrometer (not represented).

The walls 10, together with reflector 3 as cover and carrier plate 7 as base, with corresponding formation with reflecting material, for example quarzal or $Al_2O_3$ can form an IR radiation hollow space of high quality.

Figure 4:
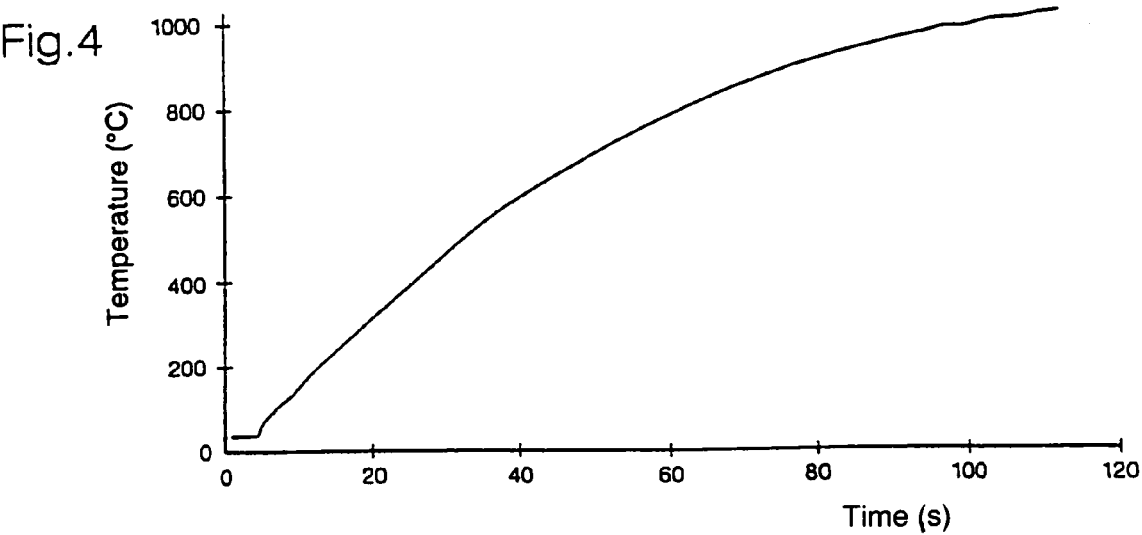
FIG. 4 the heating curve of a glass material in a heating device comprising diffusors and reflectors.

FIG. 4 shows the heating curve of a borosilicate glass according to a process of the invention, in which the glass sample had dimensions of about 1100 mm with a thickness of 3 mm.

The heating process or the heat treatment took place as described in the following:

The heating of the glass samples occurred first of all in an IR radiation hollow space walled-in with quarzal according to FIG. 3A, the cover of which was formed by an aluminum reflector with IR radiators present under it. The glass samples or glass-ceramic bodies were borne in a suitable manner on quarzal.

In the IR radiation hollow space the glass or the glass-ceramic material was irradiated directly by several halogen IR radiators, which were located at a distance of 10 mm to 150 mm over the glass or the glass-ceramic material.

The heating-up of the glass or of the glass-ceramic material now took place by means of orientation (Ansteuerung) of the IR radiators over a thyristor plate on the basis of absorption, reflection and scattering processes, as thoroughly described in the following:

Since the absorption length of the used short wave IR radiation in the glass or in the glass-ceramic material is very much greater than the dimensions of the objects to be heated, the major part of the impinging radiation is allowed to pass through the sample. Since, on the other hand, the absorbed energy per volume at very point of the glass or glass-ceramic body is nearly equal, there is achieved a homogeneous heating over the entire volume. In the process according to FIG. 4 the IR radiators and the glass material to be heated are located in a hollow space, the walls and/or cover and/or base of which consist of a material with a surface of high reflectivity or high backscattering capacity, in which at least a part of the wall, base, and/or cover surface scatters back the impinging radiation predominantly diffusely. Thereby the predominant part of the radiation is let through again into the object to be heated and is again partially absorbed. The path of the radiation lest through the glass or the glass-ceramic material also in the second passage is analogously continued. With this process thee is achieved not only a heating homogenous in depth, but also the energy expended is clearly better utilized than in the case of only a single passage through the glass or the glass-ceramic material. It is especially preferred for the process described here that at least a part of the wall, base and/or cover surface does not reflect the impinging radiation directly, but is diffusely backscattered. Thereby the radiation passes from all directions and under all possible angles into the glass or the glass-ceramic material, so that the heating simultaneously occurs homogeneously over the surface and a depiction of the intensity distribution of the radiation source onto the objects to be heated as hitherto in the state of the art.

Figure 5:
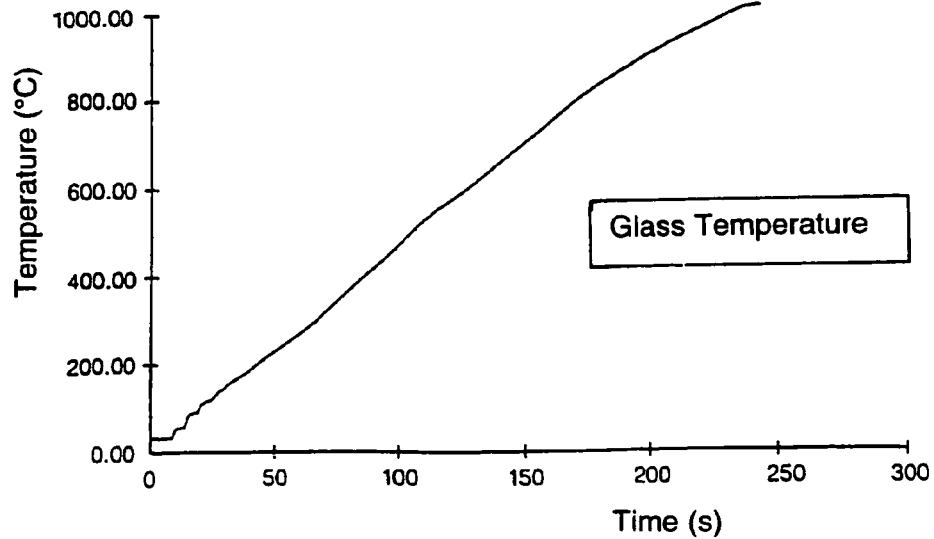
FIG. 5 the heating curve of a glass material in a device with an absorbent carrier body.
Figure 3B:
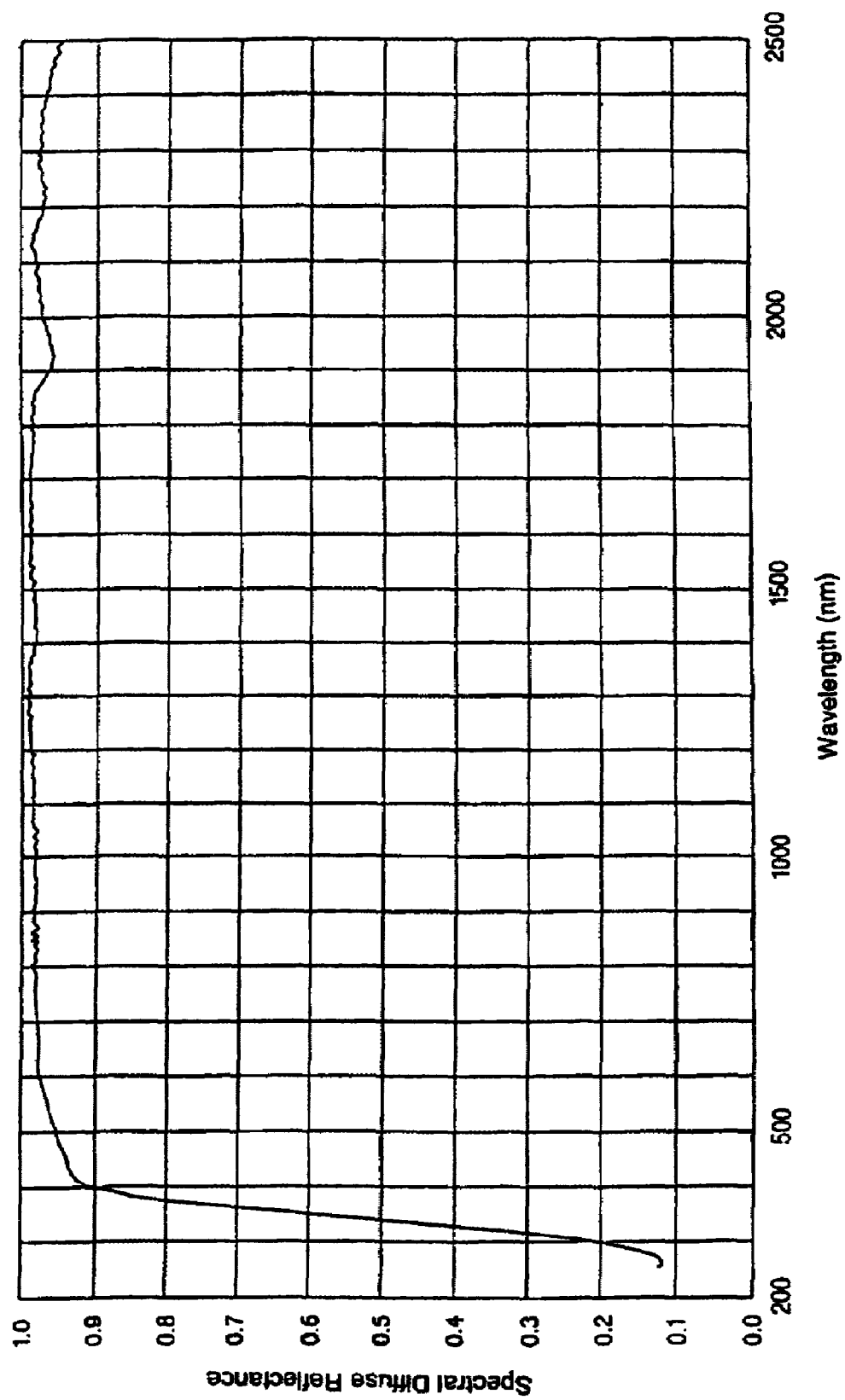
FIG. 3B the remission curve over the wavelength of $Al_2O_3$Sintox Al of the Morgan Matroc, Troisdorf, with a remission degree >95% in the near-IR wavelength range.

FIG. 5 shows the heating curve of the glass according to an alternative process according to the invention with absorbent carrier body. The diameter of the glass body was 100 mm with a thickness of 10 mm.

The heating occurred as described in the following:

First the glass sample outside of the radiation hollow space is emplaced on a carrier body of SiSiC with the thickness of 5 mm.

Thereupon the carrier made of SiSiC is introduced into a radiation hollow space surrounded with quarzal.

Thereupon the glass or the glass-ceramic material is directly irradiated with one or, according to the geometry of the glass of or the glass-ceramic material, also with several halogen IR radiators which are present in a reflector over the glass or the glass-ceramic material at a distance of 10 mm to 150 mm.

The heating-up of the glass or of the glass-ceramic material now takes place by the orientation of the IR radiators over a thyristor controller by a combination of direct and indirect heating.

Due to the transparency of the glass or of the glass-ceramic material a considerable share of the radiation output will radiate directly onto the carrier. The black SiSiC carrier absorbs nearly the entire radiation and distributes it rapidly and homogeneously over the entire surface of the carrier. The heat of the carrier is now given off likewise homogeneously to the glass or the glass-ceramic material and heats this from the underside. This process represents in the present process the indirect component of the heating-up.

The direct contribution to the heating-up is subdivided into two components. The first component is yielded from the fact that at all wavelengths outside of the transparent zone the glass or the glass-ceramic material is opaque and therewith the radiation can heat only the surface or surface-near layers. The second contribution to the direct heating-up is delivered by the slightly absorbed part of the radiation, the wavelength of which lies in a range in which the glass or the glass-ceramic material absorbs weakly. This component leads to a heating-up of deeper layers of the glass or of the glass-ceramic material.

The major part of the IR radiation, however, penetrates the glass by radiation and results in an indirect heating-up over the carrier. Also in this process a high temperature homogeneity is achieved over the glass surface and in this manner there is avoided a depicting of the radiation source onto the glass as in the state of the art.

According to the invention the indirect component of the heating-up of the glass or of the glass-ceramic material in both the processes described in FIGS. 4 and 5 amounts to more than 50%.

With the invention there are given for the first time processes and devices for the heating or supporting or exclusive heating of glass or of glass-ceramic materials which ensure a homogeneous heating of the same, have a high energy utilization as well as avoiding a depicting of the radiation source on the object to be heated. The process and the device can be used in a large number of areas of glass processing. Only by way of example and not exclusively so, let there be listed the following applications of the process of the invention:

the temperature-homogeneous heating-up of glass-ceramic blanks in ceramization the rapid reheating of glass blanks for a following hot shaping the homogeneous heating of fiber bundles to drawing temperature the supporting and exclusive heating in mixture fusing the melting and purifying of glass and/or of glass-ceramic materials the supporting or exclusive heating in the shaping, especially in the drawing, in the rolling, in the casting, in the throwing, in the pressing, in the blowing in the blow—blow process, in the blowing in the press-blow process, in the blowing in the ribbon process, for the flat-glass production as well as in the floating the supporting or exclusive heating in the cooling, in the melting, in the thermal solidifying, in the stabilizing or fine cooling for the setting-in of a desired fictitious temperature, of a desired index of refraction, of a desired compaction with subsequent temperature treatment, in the aging of thermometer glasses, in the demixing, in the dyeing of tarnished glasses, in controlled crystallizing, in diffusion treatment, especially chemical solidifying, in reshaping, especially lowering, bending, buckling, blowing, in the separating, especially in the melting-off, breaking, setting, bursting, in the cutting, in the joining as well as in coating.

The invention claimed is:

1. A method for the homogeneous heating of semi-transparent and/or transparent glass articles and/or glass-ceramic materials using infrared radiation emitted by IR radiators, whereby a glass article and/or glass-ceramic material is subjected to a heat treatment in the range from 20° C. to 3000° C. characterized in that the heating is achieved by a component of infrared radiation acting directly on the glass article and or the glass-ceramic material as well as a component of infrared radiation acting indirectly on the glass article and/or glass-ceramic material, in which the component of the radiation acting indirectly on the glass material and/or the glass-ceramic materials amounts to more than 50% of the total radiation output emitted by IR radiators, and wherein the radiation is a shortwave infrared radiation with a color temperature higher than 1500 K.

2. The method according to claim 1, wherein the infrared radiation acting indirectly on the glass article and/or the glass-ceramic material comprises at least a proportion of reflected and/or scattered radiation.

3. The method according to claim 1, wherein on the average more than 50% of the total radiation output of shortwave infrared radiation which is emitted by the IR radiators is not absorbed when it impinges on the glass article and/or glass-ceramic material once.

4. The method according to claim 1, wherein the process is carried out in a space which is bounded by wall, floor and ceiling surfaces of an infrared radiation cavity.

5. The method according to claim 4, wherein a proportion of the component of infrared radiation acting indirectly on the glass article and/or glass-ceramic material is reflected and/or scattered by at least a part of the wall, floor and/or ceiling surfaces.

6. The method according to claim 5, wherein the proportion of the infrared radiation which is reflected and/or scattered by the part of the wall, floor and/or ceiling surfaces amounts to more than 50% of the radiation which impinges on these surfaces.

7. The method according to claim 5, wherein the proportion of the infrared radiation which is reflected and/or scattered by the part of the wall, floor and/or ceiling surfaces amounts to more than 90% of the radiation which impinges on these surfaces.

8. The method according to claim 1, wherein the infrared radiation which acts indirectly on the glass article and/or glass-ceramic material comprises a proportion of infrared radiation which is absorbed by a support body, converted into heat and emitted to the glass article and/or glass-ceramic material, which is thermally connected to the support body.

9. The method according to claim 8, wherein heat is transferred to the glass article and/or glass-ceramic material, which is thermally connected to the support body via heat radiation and/or heat conduction and/or convection.

10. The method according to claim 8, wherein ceramic plates are used as the support body.

11. The method according to claim 8, wherein the support body comprises SiC.

12. The method according to claim 8, wherein the emissivity of the support body is greater than 0.5.

13. The method according to claim 8, wherein the thermal conductivity of the support body in the region of the heat treatment temperature is at least five times as great as that of the glass article or of the glass-ceramic material to be treated.

14. The method according to claim 5, wherein the proportion of the infrared radiation reflected which is reflected and/or scattered by the part of the wall, floor and/or ceiling surfaces amounts to more than 95% of the radiation which impinges on these surfaces.

15. The method according to claim 5, wherein the proportion of the infrared radiation reflected which is reflected and/or scattered by the part of the wall, floor and/or ceiling surfaces amounts to more than 98% of the radiation which impinges on these surfaces.

16. The method according to claim 8, wherein the support body comprises SiSiC.

17. A method for the homogeneous heating of semi-transparent and/or transparent glass articles and/or glass-ceramic materials using infrared radiation emitted by IR radiators, whereby a glass article and/or glass-ceramic material is subjected to a heat treatment in the range from 20° C. to 3000° C. characterized in that the heating is achieved by a component of infrared radiation acting directly on the glass article and/or the glass-ceramic material as well as a component of infrared radiation acting indirectly on the glass article and/or glass-ceramic material, in which the component of the radiation acting indirectly on the glass article and/or the glass-ceramic material amounts to more than 50% of the total radiation output emitted by IR radiators, wherein the infrared radiation which acts indirectly on the glass article and/or glass-ceramic material comprises a proportion of infrared radiation which is absorbed by a support body, converted into heat and emitted to the glass article and/or glass-ceramic material, which is thermally connected to the support body.

18. The method according to claim 17, wherein heat is transferred to the glass article and/or glass-ceramic material, which is thermally connected to the support body via heat radiation and/or heat conduction and/or convection.

19. The method according to claim 17, wherein ceramic plates are used as the support body.

20. The method according to claim 17, wherein the support body comprises SiC.

21. The method according to claim 17, wherein the emissivity of the support body is greater than 0.5.

22. The method according to claim 17, wherein the thermal conductivity of the support body in the region of the heat treatment temperature is at least five times as great as that of the glass article or of the glass-ceramic material to be treated.

23. The method according to claim 17, wherein the support body comprises SiSiC.

* * * * *